United States Patent
Saddler et al.

[15] 3,683,379
[45] Aug. 8, 1972

[54] VEHICLE CONTROL SYSTEM AND EQUIPMENT

[72] Inventors: Ivan R. Saddler, Scottsdale, Ariz.; Robert W. Tucker, Rockville, Md.

[73] Assignee: Motorola, Inc., Franklin Park, Ill.

[22] Filed: Oct. 21, 1970

[21] Appl. No.: 82,713

[52] U.S. Cl. ............343/7 ED, 343/721, 343/840, 180/98
[51] Int. Cl. .................................G01s 9/02
[58] Field of Search .......343/7 ED, 8, 701, 721, 838, 343/840; 180/98; 325/16

[56] References Cited

UNITED STATES PATENTS

| | | |
|---|---|---|
| 2,423,648 | 7/1947 | Harsell ......................343/840 |
| 2,804,160 | 8/1951 | Rashid..........................180/98 |
| 3,383,682 | 5/1968 | Stephens ......................343/8 |
| 2,690,555 | 9/1954 | Bradley ..................343/7 ED |

*Primary Examiner*—Benjamin A. Borchelt
*Assistant Examiner*—N. Moskowitz
*Attorney*—Mueller and Aichele

[57] ABSTRACT

A vehicle warning and control system and equipment is disclosed utilizing radio frequencies and the Doppler principle wherein one of the vehicle lights acts as the R.F. radiator, reflector, receiving antenna as well as an illuminator, and through standard circuitry supplies a warning signal or a brake activating signal.

10 Claims, 2 Drawing Figures

PATENTED AUG 8 1972  3,683,379

INVENTOR.
Ivan R. Saddler
Robert W. Tucker
BY
ATTY'S.

VEHICLE CONTROL SYSTEM AND EQUIPMENT

BACKGROUND OF THE INVENTION

This invention relates to vehicle control systems and equipment, more particularly to automobile control systems and equipment for automatically giving a warning of collision danger and, alternatively, applying the brakes when collision danger exists, and it is an object of the invention to provide an improved system and equipment of this character.

In more recent times, people have become ever more conscious of automobile safety, of means for making automobiles safer, and of means of telling the driver of an automobile that he is approaching, too fast, another automobile going in the same direction. The number of human deaths resulting from automobile collisions, including rear-end collisions is alarmingly high and it is in the interest of everyone to reduce them. Controlling the automobile including giving an alarm in the instances referred to is one way of helping in this effort. In some instances the automobile brakes could be applied in the absence of any action on the driver's part.

When such a control system is applied to an automobile whether new or used, it should not be expensive. The cost of all things is also one of generally increasing concern.

Accordingly it is a further object of the invention to provide a safety system of the character described which is simple and economical to make and use.

It is a further object of the invention to provide a safety system of the character described which is small in size and can be made from standard and well known components.

The Doppler effect utilized in connection with the radiation of high frequencies and the detection of their reflection from objects is one aspect of the present invention. A further aspect of it is the use of existing automobile equipment to supply some of the needed components of the system. Thus it is an object of the invention to utilize the filament and reflector of one of the lights on an automobile as a radiator and reflector for transmitting a high frequency signal but also as an antenna system for picking up the reflected signal. In addition the light serves its ordinary and intended purpose of providing illumination.

DESCRIPTION OF THE PRIOR ART

Combined light and radio frequency transmission and receiving antenna systems are known, for example, in the U.S. Pats. Nos. 2,423,648 Hansell, 2,895,127 Padgett, 2,972,743 Svensson, et al. Radar type warning systems for detecting or measuring the speed of passing or approaching vehicles are known, as in the U.S. Pats. Nos. 2,605,393 Holm, 2,974,304 Nordlund, and 3,120,640 Midlock et al. The Doppler principle is disclosed in U.S. Pat. No. 2,856,853 Diamond et al. None of these patents disclose or suggest the applicants' invention.

SUMMARY OF THE INVENTION

According to one form of the invention there is provided in a radio frequency Doppler effect vehicle control system for controlling the distance of such vehicle relative to another object, a transmitting and receiving antenna system for said radio frequency comprising the filament and reflector of one of said vehicle lights.

According to another form of the invention, a vehicle control system for a vehicle having a headlight including a filament and a reflector mounted thereon is provided comprising a high frequency oscillator on such vehicle, a transmitting radiator of said high frequency comprising the filament of said headlight, a reflector for said radiator comprising the reflector of said headlight, said reflector and filament constituting the receiving antenna means, signal detecting and amplifying means connected to said receiving antenna means, and vehicle control means connected to said amplifying means.

DESCRIPTION OF THE PREFERRED EMBODIMENT

Figure 2:
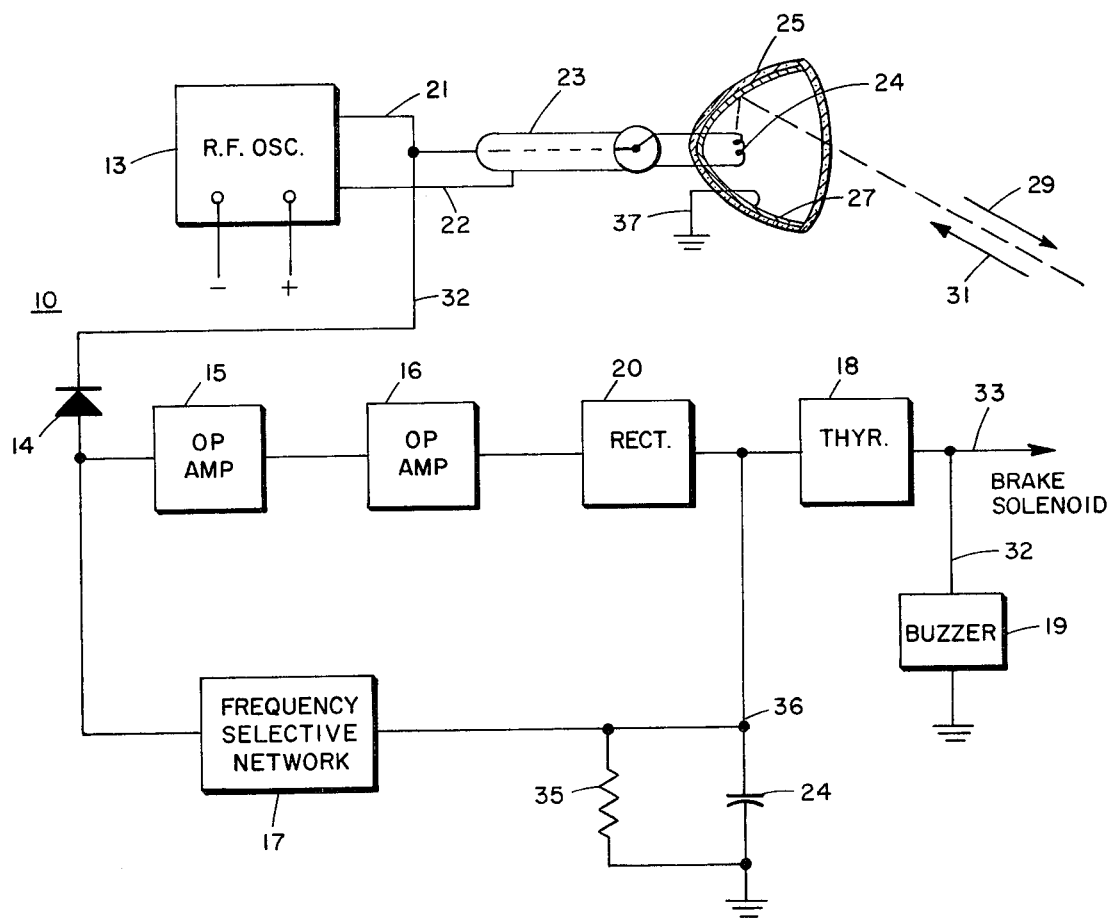
FIG. 2 is a circuit diagram in block form illustrating one manner of carrying out the invention.

Referring more particularly to the drawing, the invention is shown as comprising a radio frequency transmitting and receiving circuit 10 embodied in an automobile 11 shown behind a second automobile 12. The transmitting and receiving circuit 10 comprises an R.F. oscillator 13, a high frequency detector 14 which may be a Shottky diode, also known as a hot carrier diode, two stages 15 and 16 of operational amplifiers, a rectifier 20, and a frequency selective network 17 connected in feedback relationship to the operational amplifiers and rectifier. The output operational amplifier 16 is connected through rectifier 20 to a thyristor, or other SCR solid state device 18, the output of which is supplied to a buzzer or other warning signal device 19 and/or to a brake operating solenoid, as shown in FIG. 2.

The R.F. frequency generated by R.F. oscillator 13 may be of the order of 850 megahertz which is supplied over conductors 21 and 22 through a coaxial cable 23 to the terminals of the filament 24 of one of the automobile headlights 25.

Figure 1:
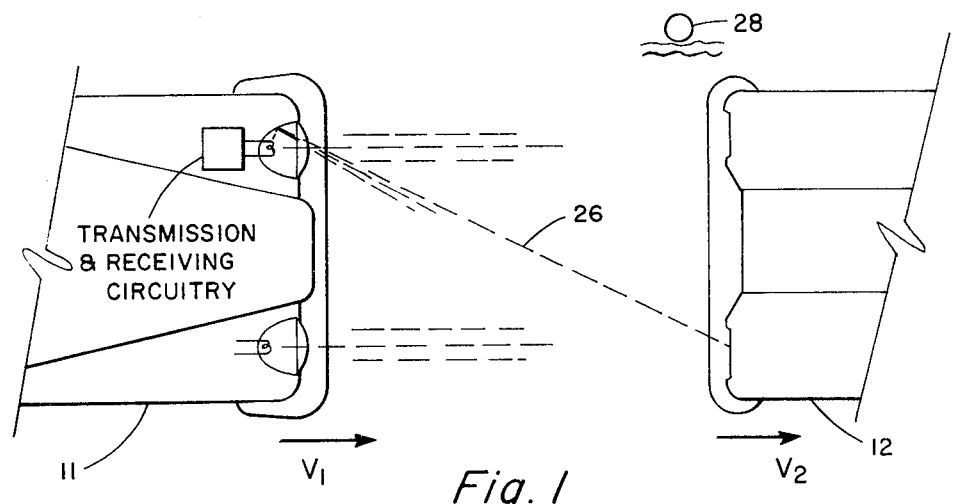
FIG. 1 is a diagrammatic representation of an automobile warning system according to the invention.

For best results the R.F. signal is supplied to the filament of the left-hand headlight of the vehicle as shown in FIG. 1. Conventionally, the left-hand headlight is focused slightly at an angle toward the right so as to shine light across the road as shown by the angular ray 26 in FIG. 1. The metallic (metallic film) reflector 27 of the headlight acts as a reflector of the R.F. signal radiated by filament 24 and thus reflects the R.F. signal in the same direction as the light rays. In this manner onward coming cars in the left-hand lane tend not to reflect a signal to the detecting circuit. Similarly other obstructions, such for example as telephone poles 28 or the like, to the left of the principle vehicle do not actuate the detecting network. Upon appropriate adjustments being made, it will be understood that the right-hand headlight or tail light, for that matter, of a particular vehicle may be used.

It has been found by measurements of a typical automobile headlamp, such for example as the headlamp 4001 sold under the trademark of TUNG-SOL by Wagner Electric Corporation, that the filament has a natural resonant frequency of about 840 to 850 megahertz. Such a headlamp is most directive at about 850 megahertz and its radiation resistance is lowest at about 800 megahertz. The maximum R.F. output of such a headlamp filament and reflector occurs in the vicinity of 800 to 850 megahertz.

The invention operates according to the radar principle wherein a signal of a certain frequency is reflected from a source to a target as shown by the arrow 29 in FIG. 2 and a signal from the target upon which the radiated signal impinges is reflected back to the transmitting antenna as shown by the arrow 31. The reflected signal 31 impinges upon the reflector 27 of headlamp 25, is reflected to filament 24, and is transmitted over the coaxial cable 23 through conductor 32 to the detecting Shottky diode 14. The Shottky diode 14 also receives the transmitted signal over the same conductor 32 and thus is in a position to detect the outgoing-incoming frequencies as well as signals corresponding to the sum and difference frequencies.

The invention functions by utilizing the Doppler effect according to well understood principles. According to these principles the apparent frequency or, Doppler frequency, determined by the difference between velocities V1 and V2 of the following and leading vehicles, respectively, is euqal to $2V/\lambda$, where $V$ is the difference velocity between the two vehicles, that is V1 minus V2 and $\lambda$ is the wavelength of the transmitted frequency.

Typically the difference of velocities V1 and V2 might lie between the values of 5 miles per hour and 60 miles per hour which is to say a difference of between 7.33 feet per second and 88 feet per second. Translating these differences into frequencies according to the relationship set forth and utilizing a transmitting frequency of 850 megahertz, the difference, of Doppler frequencies, would lie between the values of about 12.6 hertz and 152 hertz.

The typical nature of the difference velocities of 5 miles per hour and 60 miles per hour may be understood when considering that a vehicle moving at 5 miles per hour and hitting a stationary object will result in fender bending type damage, whereas the same vehicle hitting an obstruction at 60 miles an hour will result in a demolished automobile and likely a dead driver and occupants. Corresponding conditions would occur when the trailing vehicle is moving with a velocity V1 between 35 and 90 miles per hour while the leading, or vehicle being overtaken, is moving at a velocity of 30 miles per hour. The difference or Doppler frequency may therefore be taken, conveniently, as lying between the values of 10 hertz and 150 hertz.

Referring to FIG. 2 the frequency selective network 17 is chosen according to well known principles so as to discriminate against frequencies above and below this indicated range. The thyristor or SCR 18 is turned on when the following vehicle 11 approaches the leading vehicle 12 with a velocity between the values of 5 miles per hour and 60 miles per hour. The thyristor 18 may be connected to any positive voltage source such for example as the automobile battery and its output may energize a warning buzzer 19 through conductor 32, or through conductor 33, may energize a brake applying solenoid. The loudness of the buzzer 19 or the force with which the brake solenoid applies the brakes may be related to the magnitude of the detected signal which corresponds to the rate at which the following vehicle is overtaking the leading vehicle.

The distance over which the transmitting and receiving system is effective need not be large. For example, about 300 feet is adequate, inasmuch as this distance is about equal to that which an automobile travelling 60 miles an hour will take to stop between the interval that the driver sees an emergency situation and applies the brake full on.

A slight time delay, for example, one-tenth of a second may be built into the detecting mechanism as by the bypass capacitor 34 and shunting resistor 35 shown connected to the conductor 36 and ground. Such a slight time delay will cause the circuit to be nonresponsive to objects moving by quickly, such for example as a telephone pole 28 or an oncoming vehicle in the opposite lane. Typically the capacitor 34 might have a value of one-tenth of a microfarad and the resistor have a value of 1 megohm.

The headlight 25 serves a dual function. At night time when the lights are being used the filament 24 and reflector 27 supply the usual roadway illumination while at the same time they form the radiator and reflector of the high frequency used in the detecting system. Accordingly, costs are reduced.

The R.F. oscillator 13 may be of any well known and standard design operating in the frequency range indicated and may be of the form placed upon a printed circuit board. Conveniently, it may be a continuous wave oscillator. Similarly the operational amplifiers 15 and 16 and the frequency selective network 17 may be of well known designs and may be part of a well known integrated circuit component. In this manner the cost of the system components utilized in the invention is very small and the overall cost of the system might be very small.

The system has been found to function with the metallic reflector 27 ungrounded and floating. But better results would be achieved if the reflector is available and can be grounded by a conductor 37 as shown. In the latter case, the reflector operates substantially more efficiently.

While one form of the invention has been shown, it will be understood that other forms may be devised within the scope of the disclosure.

What is claimed is:

1. In a radio frequency Doppler effect vehicle control system for controlling the distance of such vehicle relative to another object, a transmitting and receiving antenna system for said radio frequency comprising the filament and reflector of one of said vehicle lights.

2. The invention according to claim 1 wherein said filament and reflector are those of the left front headlight of an automobile.

3. The invention according to claim 1 wherein said control system comprises an alarm signal device.

4. The invention according to claim 3 wherein said alarm signal device comprises an audible alarm.

5. The invention according to claim 2 wherein the vehicle control system comprises a vehicle brake operating device.

6. A vehicle control system for a vehicle having a headlight including a filament and a reflector mounted thereon comprising a high frequency oscillator on such vehicle, a transmitting radiator of said high frequency comprising the filament of said headlight, a reflector for said radiator comprising the reflector of said headlight, said reflector and filament constituting the receiving antenna means, signal detecting and amplifying means connected to said receiving antenna means, and vehicle control means connected to said amplifying means.

7. The invention according to claim 6 wherein the oscillator comprises a continuous wave oscillator.

8. The invention according to claim 2 wherein the radio frequency is essentially the natural resonant frequency of the headlight filament.

9. The invention according to claim 2 wherein the radio frequency is of the order of 850 megahertz.

10. The invention according to claim 2 wherein the control system is operative for difference velocities of two vehicles going in the same direction between 5 and 90 feet per second.

* * * * *